US010643173B2

(12) United States Patent
Simms et al.

(10) Patent No.: US 10,643,173 B2
(45) Date of Patent: May 5, 2020

(54) SMART DELIVERY BINS

(71) Applicants: John Simms, Mclean, VA (US); Noel Simms, Jackson, MS (US); John Simms, Jr., Arlington, VA (US)

(72) Inventors: John Simms, Mclean, VA (US); Noel Simms, Jackson, MS (US); John Simms, Jr., Arlington, VA (US)

( * ) Notice: Subject to any disclaimer, the term of this patent is extended or adjusted under 35 U.S.C. 154(b) by 216 days.

(21) Appl. No.: 15/695,284

(22) Filed: Sep. 5, 2017

(65) Prior Publication Data

US 2018/0144299 A1 May 24, 2018

Related U.S. Application Data

(60) Provisional application No. 62/382,798, filed on Sep. 2, 2016.

(51) Int. Cl.
*G06Q 10/08* (2012.01)
*G07C 9/00* (2020.01)
*G06Q 10/10* (2012.01)

(52) U.S. Cl.
CPC ..... *G06Q 10/0836* (2013.01); *G06Q 10/1097* (2013.01); *G07C 9/00309* (2013.01); *G07C 9/00896* (2013.01); *G07C 2009/00769* (2013.01); *G07C 2209/08* (2013.01)

(58) Field of Classification Search
CPC .................................................... G06Q 10/08
See application file for complete search history.

(56) References Cited

U.S. PATENT DOCUMENTS

| | | | |
|---|---|---|---|
| 9,535,421 B1 * | 1/2017 | Canoso | G05D 1/0214 |
| 2015/0329260 A1 * | 11/2015 | Singh | B65D 79/00 |
| | | | 705/28 |
| 2015/0371468 A1 * | 12/2015 | Mackin | G06Q 10/0836 |
| | | | 340/5.26 |
| 2016/0140496 A1 * | 5/2016 | Simms | G06Q 10/0835 |
| | | | 705/337 |
| 2016/0171568 A1 * | 6/2016 | Cao | G06O 30/04 |
| | | | 705/34 |
| 2016/0239802 A1 * | 8/2016 | Burch | H04W 4/70 |
| 2017/0036798 A1 * | 2/2017 | Prahlad | B65G 1/137 |
| 2017/0213173 A1 * | 7/2017 | Dong | G06Q 10/087 |

* cited by examiner

*Primary Examiner* — Kurtis Gills
(74) *Attorney, Agent, or Firm* — Dennis P. Clarke

(57) ABSTRACT

An improved method and system for the delivery of items to at least one of a plurality of locked storage appliances comprising determining the availability of a locked storage appliance to receive the delivery at one or more times, identifying a time during which the delivery can be made, sending to the identified locked storage appliance an access signal allowing a delivery agent access to the locked storage appliance during the time interval for delivery, the improvement wherein at least one of the plurality of storage appliances is a smart appliance.

15 Claims, 10 Drawing Sheets

SMART DELIVERY BINS

CROSS REFERENCE TO RELATED APPLICATION

This application claims the benefit of Provisional U.S. Patent Application No. 62/382,798, filed Sep. 2, 2016, the entire contents and disclosure of which, both express and implied, are incorporated herein by reference.

BACKGROUND OF INVENTION

The recent upsurge in e-commerce whereby a consumer accesses a website over the internet to purchase goods for delivery to the home, office or other site has created a need for secure systems/methods for scheduling and tracking deliveries of the purchased items, as well as for providing a safe and secure site for receipt of the goods when they are delivered to an unoccupied site. The convenience of being able to avoid making trips to a brick and mortar store or outlet to purchase goods, and having the goods delivered to home, office or other site is off-set by the problems surrounding the secure delivery of the goods to the purchaser. If the purchaser is not available on-site to receive the goods, delivery must either be re-scheduled or the goods must be left unsecured at the site, thereby being subject to theft or damage.

U.S. Pat. No. 6,903,832 describes a system and method which enables the delivery, and safe and secure receipt of purchased items or other goods, at an unattended site.

The patented method and system enables the delivery of at least one purchased or ordered item to a locked storage appliance, associated with a corresponding customer, the method comprising, following the purchase or order of the at least one item, determining the availability of the locked storage appliance to receive the delivery at one or more times, identifying a time interval during which the delivery can be made, and sending to the locked storage appliance an access signal allowing a delivery agent access to the locked storage appliance only during the time interval for delivery thereto of the at least one item.

Copending patent application Ser. No. 14/544,035, filed Feb. 2, 2015, describes an improvement in the patented system wherein the delivery agent is a drone aircraft.

SUMMARY OF THE INVENTION

The present invention relates to a still further improvement in the patented method and system wherein delivery is made to at least one of plurality of interlocking "smart" storage appliances.

DETAILED DESCRIPTION OF THE INVENTION

Figure 1:
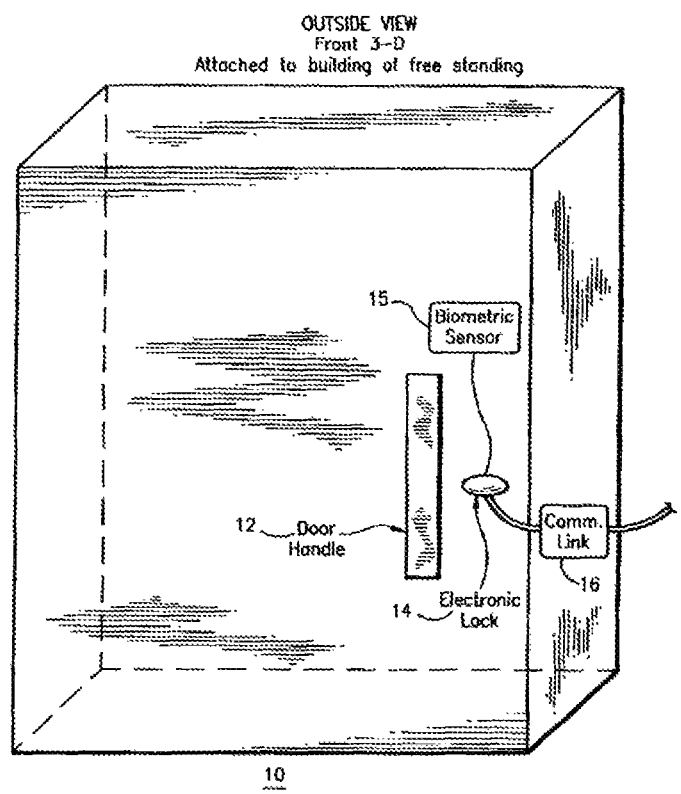
FIG. 1 is an elevational view of a locked storage appliance embodiment of the invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention is predicated on the unexpected discovery that a method for the delivery of at least one purchased or ordered item to a locked storage appliance associated with a corresponding customer, the method comprising, following the purchase or order of the at least one item, determining the availability of a locked storage appliance to receive the delivery at one or more times, identifying a time interval during which the delivery can be made, sending to the identified locked storage appliance an access signal allowing a delivery agent access to the locked storage appliance only during the time interval for delivery thereto of the at least one item can be vastly improved where the locked storage appliance is part of a system of "smart" interlocking locked storage appliances.

The term, "smart", as used herein in connection with locked storage appliances, is refers to an electronic device in each appliance generally connected to each other and to networks via different wireless protocols such as Bluetooth, NFC, Wi-Fi, 3G, etc., that can operate to at least some extent interactively and autonomously. The term also refer to a device that exhibits some properties of ubiquitous computing, including, but not limited to, artificial intelligent.

The method and system of the invention allow access to at least one of the locked smart storage appliance in the system of interlocking smart storage appliance at foxed sites/locations/addresses by means of a specific identifier which only unlocks the entry door to the interior of a particular, pre-identified locked smart storage container.

It will be understood by those skilled in the art that an "identifier" includes a physical device, such as a key, electronic key, smart card, magnetic card, or similar device carried or transported by a delivery agent; a biometric property such as fingerprint, voice recognition, retinal scan of a delivery agent; wireless communication options such as any duplex, half-duplex, or full-duplex communication method including but not limited to: Near Field Communications (NFC), WiFi, Bluetooth, Radio, RFID, Mesh Networking Protocols (i.e. FabFi, G.hn, etc.), Ethernet, Telephone, Fiber Optic, Optical, Barcode, QR Code, or any combination of methods, or any other element which operates to unlock the appliance, locker or device upon being sensed and identified by the latter.

Typical locations for the system of locked smart storage appliances are near or affixed to the exterior of a home or office. The locked smart bins are capable of receiving and storing goods for delivery or pickup with a level of security preventing unauthorized entry or theft and with protection against pests and unfavorable weather conditions. The locked smart storage appliances may be equipped with multiple storage areas, some of which may be cooled or heated. The container may be free-standing, secured to a fixed location or affixed to a structure.

The locked smart storage appliances are preferably in electronic communication with a computer or computer network by any of a variety of means, including, but not limited to a telephonic signal, television cable, computer network cable, radio signal or the like.

The locked smart storage appliances receive and transmit data to the computer or computer network via a "scheduler" which is capable of organizing and recording a schedule of deliveries and pickups utilizing the appliance, locker or device and transmitting instructions to the appliance allowing it to identify an agent authorized to access the appliance in accordance with a schedule. The locked smart storage appliances are preferably identifiable by the computer or computer network with which it is communicating by identification number, name or location. The locked smart storage appliances are also preferably associated with a particular customer's account records.

Still another embodiment of the invention comprises a method and system of scheduling and tracking deliveries, of receiving deliveries utilizing a specialized device, of making and processing payment, of inventorying items scheduled for delivery and items delivered and of making information about deliveries available through a variety of means. Users of the method and system may be entities desiring to make deliveries and/or to receive deliveries. Users of the method and system may schedule delivery, track shipment and delivery, make secure delivery via the locked smart storage appliances, make and confirm payment, inventory items scheduled for delivery and delivered. Users of the method and system may access data regarding the tacked smart storage appliances and/or delivery location stored on the computer or computer network and accessed by a variety of means including telephone, radio, computer network or the Internet. The type of data which may be accessed includes, but is not limited to, data concerning the location of the locked smart storage appliances and alternative delivery locations, the capacity and type of storage of the individual appliance, the type and availability of storage capacity at the time and date of intended delivery and special instructions or other information pertaining to the delivery appliance and location and method of payment.

The present invention may alternately be described as a method or system of: delivery of ordered items to one of a plurality of locked smart storage appliances, each associated with a corresponding customer, using a delivery system including a scheduler, the steps including: ordering a first delivery of one or more goods for a first customer associated with a first lowed smart storage appliances of the plurality of locked smart storage appliances; following the ordering of the first delivery, determining the availability of the first locked smart storage appliance to receive the first delivery at one or more times by use of the scheduler: identifying, using the scheduler, a first time interval during which the first delivery can be made; and the delivery system sending to the first locked smart storage appliances an access signal allowing a first delivery agent to access the first locked smart storage appliance only during the first time interval. The steps include: ordering a second delivery of one or more goods for the first customer; following the ordering of the second delivery, determining the availability of the first locked smart storage appliances to receive the second delivery at one or more times by use of the scheduler; identifying, using the scheduler, a second time interval during which the second delivery can be made; and the delivery system sending to the first locked smart storage appliances bin an access signal allowing a second delivery agent which is delivering the second delivery to access the first locked smart storage appliance only during the second time interval.

A delivery can be ordered for one or more goods for a second customer associated with a second locked smart storage appliance of the plurality of locked smart storage appliances. Following the ordering of the last-mentioned delivery, the availability of the second locked smart storage appliance to receive the last-mentioned delivery at one or more times by use of the schedule is determined. The method identifies, using the scheduler, a second customer time interval during which the last-mentioned delivery can be made; and the delivery system sends to the second locked smart storage appliance an access signal allowing a delivery agent which is delivering the last-mentioned delivery to access the second locked smart storage appliance only during the second customer time interval. The first delivery agent opens the first locked smart storage appliance using an identifier corresponding to the first delivery agent and the second delivery agent opens the first locked smart storage appliance using an identifier corresponding to the second delivery agent.

Following the ordering, the size of the delivery is determined using the delivery system. Available room within the first locked smart storage appliance is checked by use of the delivery system. Upon availability as indicated by the checking step, the delivery system reserves sufficient room within the first locked smart storage appliance to receive the delivery.

Following the first delivery, an account of the first customer is charged for the first delivery to the first locked smart storage appliance signaling the delivery system of the insertion of the first delivery into the first locked smart storage appliance. The first locked smart storage appliance signals the delivery system of the insertion of the first delivery into the first locked smart storage appliance based on access by the first delivery agent.

The invention may alternately be described as a method and system of delivery of ordered items to a plurality of locked smart storage appliances by a delivery agent using a delivery system, the steps including: ordering a delivery of one or more goods to a first customer; following the ordering, determining the size of the delivery using the delivery system; checking available room within a first locked smart storage appliance of the plurality of locked smart storage appliances, the first locked smart storage appliance corresponding to the first customer, by use of the delivery system; upon availability, reserving, by operation of the delivery system, sufficient room within the first locked smart storage appliance to receive the delivery; and delivering the delivery to within the first locked smart storage appliance. Upon finding that the available room within the first locked smart storage appliance is insufficient for the size of the delivery, the ordered delivery is divided into at least first and second partial deliveries for separate delivery upon there being available room. The delivery system includes a scheduler and the method further includes the steps of: following the ordering of the delivery, determining the availability of the first locked smart storage appliance to receive the first and parts at one or more times by use of the scheduler; identifying, using the scheduler, a first time interval during which the first partial delivery can be made and a second time interval during which the second partial delivery can be made; and the delivery system sending to the first locked smart storage appliance an access signal allowing access to the first locked smart storage appliance only during the first time interval for delivery of the first partial delivery and during the second time interval for delivery of the second partial delivery. Prior to dividing the ordered delivery, input is received from the customer indicating the customer's preference for a complete delivery or delivery in multiple portions; and the scheduler schedules delivery according to the customer's preference. The method further includes the step of: charging an account of the first customer for a delivery to the locked smart storage appliances signaling the delivery system of the insertion of a delivery into the locked smart storage appliances.

The invention may alternately be described as a method for delivery of ordered items to a plurality of locked smart storage appliances by a delivery agent, a delivery system, the steps including: ordering a delivery of one or more goods to a customer; delivering the delivery to within one of the locked smart storage appliances corresponding to the customer; and automatically sending a DELIVERY MADE signal from the one of the locked smart storage appliances signaling the delivery system of the insertion of the delivery into the one of the locked smart storage appliances. Upon the delivery system receiving the DELIVERY MADE signal, the delivery system performs one or more steps selected from the group consisting of: charging an account of the customer for the delivery; and automatically initiating a communication to the customer. The delivery system includes a scheduler and further includes the steps of: following the ordering, determining the availability of the one of the locked smart storage appliances to receive the delivery at one or more times by use of the scheduler; identifying, using the scheduler, a first time interval during which the delivery can be made; and the delivery system sending to the one of the locked smart storage appliances an access signal allowing a first delivery agent which is delivering the delivery to access the one of the locked smart stowage appliances only during the first time interval. The method further includes the steps of: following the ordering, determining the size of the delivery using the delivery system; and checking available morn within the locked smart storage appliances by use of the delivery system.

The delivery system of the present invention may be described as including: at least one set of locked smart storage appliances corresponding to a customer, an order receiver for receiving orders for delivery by a delivery agent of one or more goods for customer; availability determiner for determining the availability of the locked smart storage appliances to receive deliveries at one or more times; a scheduler receiving availability information from the availability determiner and operable to identify a time interval during which the delivery can be made and operable to send to the locked smart storage appliances an access signal allowing a delivery agent that is delivering a delivery to access the locked smart storage appliances only during the time interval identified by the scheduler, wherein the locked smart storage appliances are equipped with an element for receiving the access signal, access the interior of the locked smart storage appliances and deliver goods thereinto.

The locked smart storage appliances of the present invention are appliances equipped as described above with means for securely delivering goods/items therein, without requiring a agent in attendance to accept delivery and which includes: a set of locked smart storage appliances; a lock controlling access to the locked smart storage appliances; and a communication link connected to the lock and operable to receive an access signal from a remote location to allow access to the locked smart storage appliances; and wherein the lock is responsive to the communication link receiving the access signal by unlocking upon presentation of an identifier such as described above.

FIG. 1 shows an appliance 10 according to the present invention. The appliance 10 is a locked smart storage appliance with a door handle 12 and an electronic lock 14. The lock 14 may be accessed by a universal key, other physical device or other identifier (including biometric properties as discussed above). The lock 14 is capable of identifying electronically or by other means the key (more generally the identifier) being used for unlocking or opening the appliance. However, in the preferred design the appliance 10 is capable of identifying specific keys authorized for entry and/or permitting access by unlocking the door based on instructions communicated to it by a scheduler, remotely located. The scheduler is connected to lock 14 via communications link 16 such as a modem or other interface to the telephone system, the internet or other communications, and discussed in more detail below. The appliance is also capable of denying entry to keys not authorized for delivery or not authorized for delivery at that time. The appliance is preferably capable of recording and/or transmitting a log or other itemized listing of authorized and unauthorized attempt(s) at opening the appliance and may include among other information the electronic identity of each key, the date and time of the attempt.

The access to appliance 10 may be explained by an example. A first delivery agent working for a first company may have an electronic key, such as a smart card or magnetic card, unique to that individual or the first company. Alternately, and in lieu of the key or other physical access device, a biometric property (such as fingerprint, voice pattern, retinal pattern) of the delivery agent may be read by an optional biometric sensor 15. A second delivery agent working for a second company may have an electronic key, such as a smart card or magnetic card, unique to that individual or the second company. The first delivery agent may be scheduled for accessing the appliance 10 during a first time interval such as between 9 AM and 12 noon on a given day, whereas the second delivery agent may be scheduled for accessing the appliance 10 during a second time interval such as between 1 PM and 4 PM on the same day. Under such circumstances, the lock 14 could only be opened by the first delivery agent's electronic key (not shown) during the first time interval, whereas the lock 14 could only be opened by the second delivery agent's electronic key (not shown) during the second time interval. This assumes that the scheduler switches the lock 14 into an access state in which it is unlockable by an electronic key. Alternately, the scheduler could simply unlock the lock 14 so that a delivery agent could insert items in the appliance without needing a lock.

The time intervals might be much longer then the several hour time intervals above. For example, a time interval of 24 or more hours for a delivery might be used. Further, the first and second time intervals might overlap or even be identical (i.e., two deliveries scheduled for the same time interval).

Figure 2:
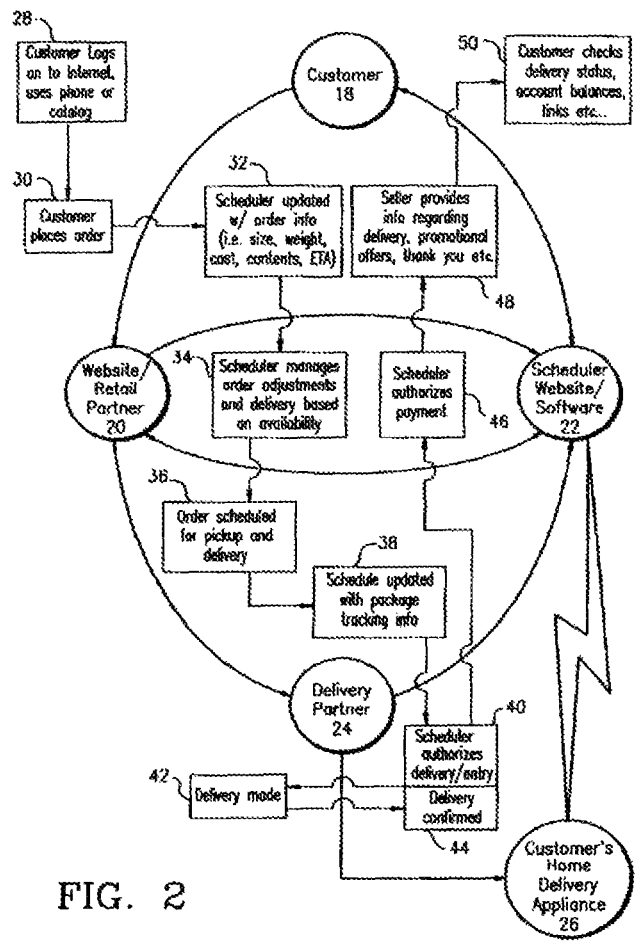
FIG. 2 is a flow sheet depicting the steps of the method of the invention overlaid on the main components or participants in the method.
Figure 3:
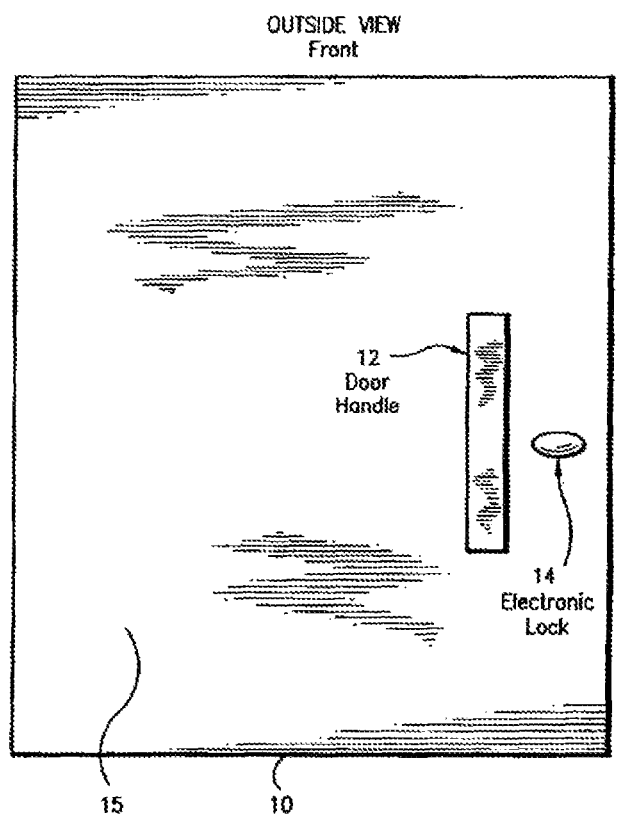
FIG. 3 is an elevational view of the front of a locked storage appliance.
Figure 4:
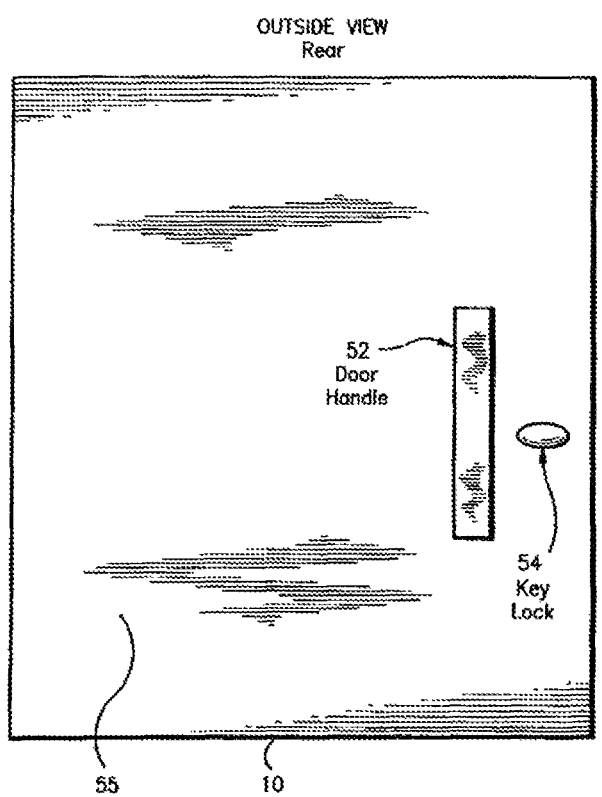
FIG. 4 is an elevational view of the rear of a locked rage appliance.
Figure 5:
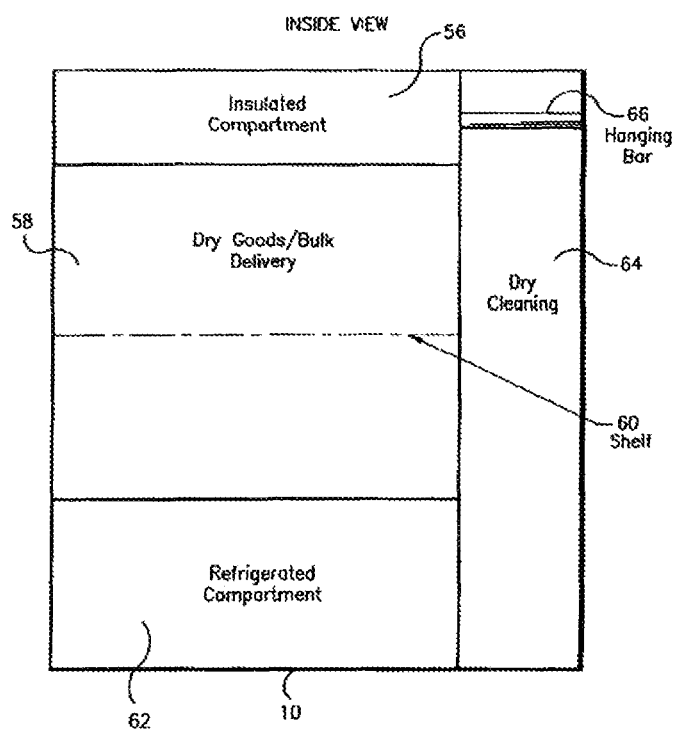
FIG. 5 is a cut-away view of the interior of a locked storage appliance.

In a typical use of the device, system and method of the invention, and with particular reference to FIG. 2, a flow chart is shown overlaid on the main components or participants linked as shown. Discussing first, the main components or participants, the customer 18 is linked to website/retail partner 20 which in turn is linked to a scheduler website software 22 and delivery partner 24. The delivery partner 24 in turn is linked to website/retail partner 20 and also to the customer's home delivery attendant 26. The various illustrated links between 18, 20, 22, 24, and 26 would preferably be Internet links, but telephone or other links could also be used for some or all of the links. It should be understood that the components 18 through 26 are shown for a particular customer, but in practice there would be a plurality of customers 18 each having an associated home delivery attendant 26. Additionally, the scheduler website/software may interact with a plurality of retail outlets 20 and a plurality of delivery partners 24. For example, there may be a retailer 20 for books, a different retailer 20 for clothing, and numerous other retailers, some competitive with others, all linked to the scheduler 22. The various delivery partners may be specialized on a geographic basis, a delivery basis (i.e., one delivers within one day, another delivers within three days, etc.), and possibly by the type of delivery being made. As will be discussed below, some orders may involve products requiring special handling such as refrigeration in transit and the delivery partner delivering such products may need a refrigerator section in a delivery truck.

Turning now to the flow chart part of FIG. 2, the steps are numbered 28 to 50, steps 40 and 44 being within a common box. At box 28, a consumer accesses an e-commerce website over the Internet to purchase goods for home delivery. The consumer identifies himself/herself as an account holder. The retailer/vendor 20 electronically looks up and verifies the account of the consumer against a register or database of accounts made available on-line by the scheduler 22. An account holder is an authorized user of an appliance(s) 10 (FIG. 1 only) capable of unattended receipt/delivery and of electronically communicating with a specialized computer program (scheduler) which schedules deliveries to the appliance and reports deliveries to the account holder. The consumer selects items for purchase and delivery and fills an electronic shopping cart.

It will be understood that the invention also contemplates delivery of items ordered by telephone, mail, or in agent at a retail store. The invention also may be used for receiving items that do not involve a commercial transaction. For example, a neighbor could return a borrowed item to the agent owning the smart bins.

As the shopping cart is loaded with goods selected, the estimated total size of the bundle of items as measured by the dimensions of height, width and depth is calculated (with software provided by the scheduler) based on information provided by the seller. Accessing information (provided by the scheduler over a computer network of the Internet) regarding the type and capacity of the appliance and the estimated remaining capacity of the appliance at the projected time/date of delivery, the estimated size of the bundle of items is compared against the total volume (including the various dimensions) of space remaining available in the consumer's designated appliance(s) on the time/date of the proposed date of delivery. Thus, an order that has a length of 5 feet will require 5 feet available within the appliance 10. If the volume or any dimension of the order exceeds available capacity, the consumer is given the option of splitting the delivery into two or more deliveries, of rescheduling the delivery for another time when capacity is available, or of removing items from the shopping cart.

The retailer or seller notifies the consumer of the final purchase price including shipping and handling. At step 30, the consumer authorizes the purchase and indicates method of payment. The consumer may arrange for payment to seller directly or by debit or credit accounts linked to the consumer's account. The seller finalizes the sale. At block 32, the seller notifies the scheduler 22 (a specialized computer program running on a delivery system computer) of the time/date of the intended delivery and the estimated size of the bundle of items. The scheduler reserves the capacity in the designated appliance for the scheduled time/date of the delivery. The seller also electronically provides to the scheduler (in format specified by the scheduler) an inventory of items purchased, itemized prices of each stem purchased, itemized shipping and handling costs, and any other information permitted by the scheduler including coupon or "cents off" offers and other advertising and promotional information. This information provided by the seller may be made accessible by the scheduler to the consumer by a variety of means and formats, including computer networks, the Internet, electronic mail, telephone or printed matter.

The setter prepares the order for shipment. If any of the items are unavailable at the time that the order is being filed or if other items are added to the shipment for any reason, the estimated size of the bundle of items is adjusted. At step 34, the seller accesses information provided by the scheduler regarding the then available capacity at the time/date of delivery. If space is available, the shipment is scheduled at step 36. If space is unavailable, the shipment is adjusted interactively until available space capacity can be confirmed and reserved. At step 38, the seller electronically provides to the scheduler information to update the order, including any shipping information, routing or tracking numbers, etc., and any additional advertising or promotional information.

Preceding the time/date of each scheduled delivery, the scheduler so communicates at step 40 electronic instructions to the appliance to permit entry to delivery agent(s) using a key which is identified by the appliance and matches a key authorized for entry for the scheduled delivery at that date/time (a time interval within an assigned date, or optionally, more than one date). If a key does not match a key authorized for entry at that time/date, entry will be denied. Once entry is gained for an authorized key, that key will be locked out until re-authorized.

When a delivery is made to the appliance 10 at step 42, the appliance communicates to the scheduler (by sending a "delivery made" signal) that the delivery was completed at step 44. Debit or credit sales at the point of delivery are processed for payment (costs of the goods and/or delivery applied to an account of the customer) at step 46. The scheduler updates the consumer's account with the time/date of receipt. The vendor selling the goods or service making the delivery may also provide information to the customer's account regarding the time/date of delivery, promotional material and other information specified above, including a "thank you" for the purchase at step 48.

The scheduler updates the consumer's account with various information regarding each purchase and scheduled delivery at step 50. The consumer may access this information through a variety of means including a computer network, an email, the Internet (i.e., checking a web page), a text message to the consumer's pager, or telephone. The consumer may review his/her account through a variety of views including available capacity by time period, committed capacity by time period, chronological list of scheduled deliveries, chronological list of scheduled deliveries by vendor, chronological list of scheduled deliveries by vendor classification (i.e., groceries, dry cleaning, etc.), deliveries made, deliveries missed, inventory of items ordered or delivered (by vendor, vendor classification, time period, etc.), inventory of items ordered but not shipped, calculation of costs (by vendor, vendor type, time period, method of payment, shipping and handling, etc.).

The consumer account holder may request to be notified at various stages of the shipping and delivery process. In addition to information, which is updated to the consumer's account and available by means previously specified, the notification may be made via electronic mail, voice or text pager, telephone, smart phone, Ipad type device or an app.

Although the discussion refers to consumers placing the orders, it will be understood that the agent ordering may also be a business customer ordering supplies for a business.

Turning now to FIGS. 2-5, the appliance 10 details will be discussed. Door handle 12 and electronic lock 14 are on the front of the appliance 10 and would be used by delivery agents to access the appliance via a front door 15. Door handle 52 and key lock 54 would be used by the customer (i.e., appliance owner) to access the rear door 55 of the appliance 10. In practice, the appliance 10 may have its front door 15 on the outside of a house (not shown) with the rear door 55 on the inside of the house. In that case, the appliance would fit in an opening in the wall of the house in similar fashion to some room air conditioners. The inside of the appliance 10 includes an insulated compartment 56 where items such as hot food (pizza, etc.) may maintain their heat. Dry goods or bulk items may be placed within compartment 58 which is subdivided by a shelf 60. A refrigerated compartment 62 and dry cleaning section 64 with a bar 66 for hanging clothes are also included. Although not separately shown, a heated compartment and a freezer compartment may also be included.

Figure 6:
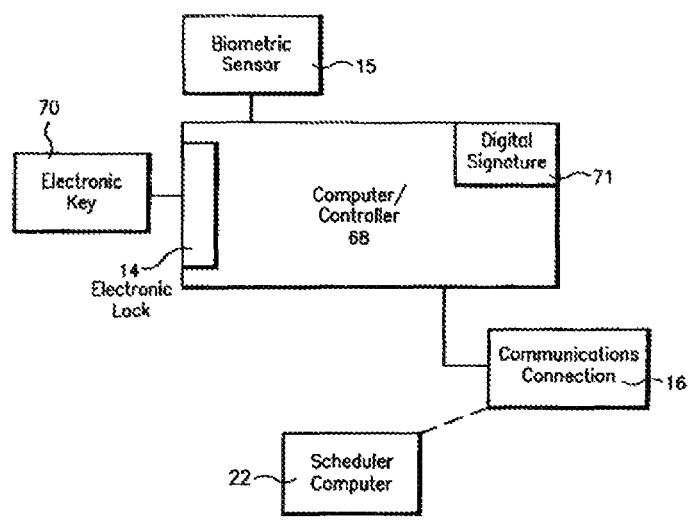
FIG. 6 is a block diagram of a system utilizing a computer as the controller between the electronic key to the locked storage appliance and the communications network.

Turning now to FIG. 6, the electronic lock 14 is connected to a computer/controller 68 that is in the appliance 10. The computer/controller 68, which may operate solenoids or other actuators (not shown) in order to unlock lock 14 or render it accessible (i.e., ready to be unlocked) via electronic key 70, communicates via communication link 16 with the scheduler 22. The link 16 may connect to scheduler 22 via the internet, telephone system, cable, wireless or other technique.

A digital signature 71 may be stored within computer 68 and may be used for acknowledging special deliveries. For example, the delivery of certain pharmaceutical products may require a signature to acknowledge receipt. Upon the insertion of a pharmaceutical delivery (or any other delivery where signature is desired or required), the computer 68 may send, as part of a DELIVERY MADE signal, an appended digital signature to authenticate the delivery. Alternately, the electronic key 70 may be part of or connected to a small computer carried by the delivery agent and operable to receive the digital signature acknowledging receipt of the delivery. Recent changes in the law in the United States, among other countries, may allow such digital signatures to be used in situations where written signatures were previously used.

Figure 7:
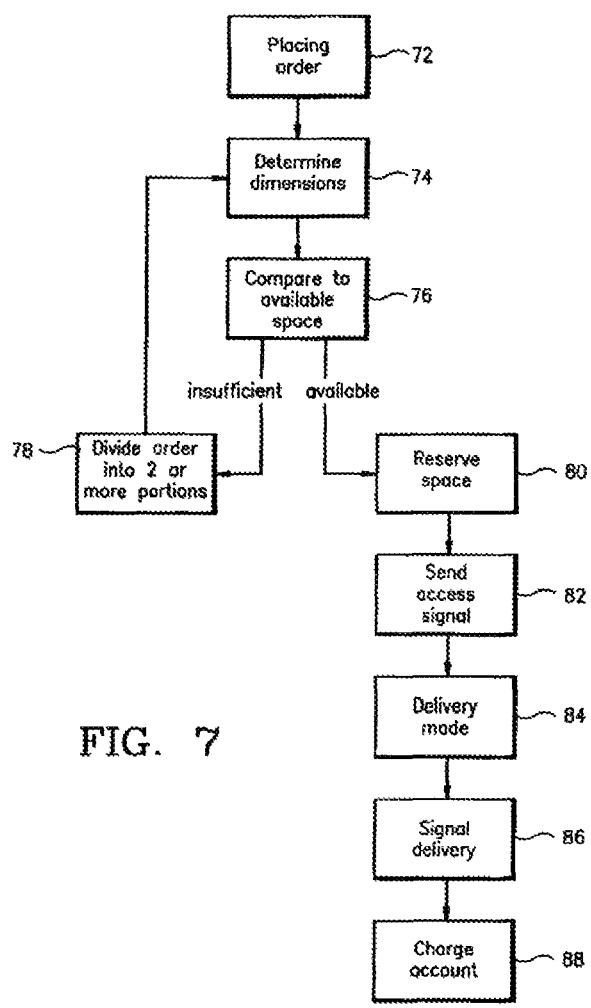
FIG. 7 is a simplified flow chart of a process of delivery to a locked storage appliance.

Turning now to FIG. 7, but also considering FIG. 2, a flow chart of some key aspects of the method of the present invention will be discussed. Except as otherwise noted the steps in FIG. 7 are performed by scheduler 22. The order is placed at step 72 by a customer on his/her computer which communicates it to the scheduler 22. At block 74, the scheduler 22 determines the dimensions of the order. These dimensions may have been supplied to scheduler 22 by the retailer 20. At block 76, the scheduler 22 compares the dimensions of the order with the available space within the appliance 10 for a given time period. The scheduler may keep a running total of space available within the appliance.

Alternately, the computer 68 of FIG. 6 may keep a running total of space available that is supplied, upon automated request, to the scheduler.

If block 76 determines that not enough space is available, control goes to block 78 where the order is divided into two or more portions for separate delivery before returning to block 74.

Once block 76 determines that sufficient space is available, control goes to block 80 where space for the delivery is reserved. Next, block 82 sends an access signal from the scheduler 22 to the appliance 10 such that a delivery agent may unlock it during a prescribed time interval. Block 84 indicates that the delivery is made, after which block 86 corresponds to the computer 68 of the appliance 10 sending a delivery made signal to the scheduler. Upon receipt of the signal indicating delivery, the scheduler 22 or another part of the delivery system computer on which the scheduling software runs, sends a charge account signal. The charge account signal debits or charges the customer's account for the delivery which had just been made.

Figure 8:
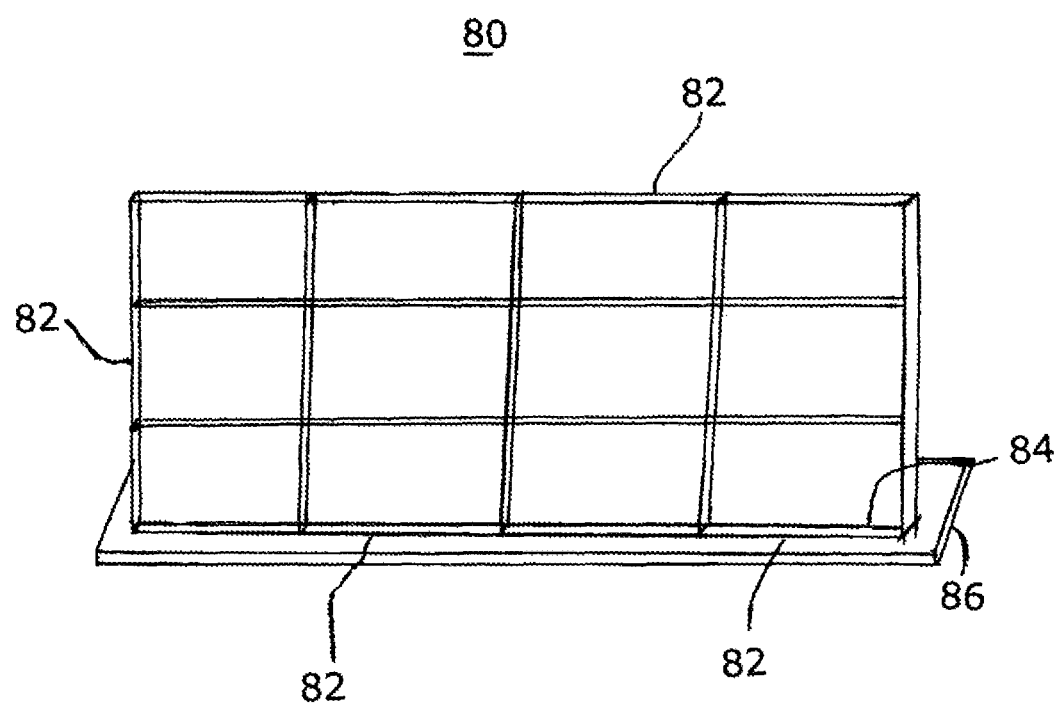
FIG. 8 is a perspective front view of a system comprising a single file of interlocking smart locked storage appliances.

FIG. 8 illustrates an embodiment of a system 80 of interlocking smart locked storage appliances 82 according to the invention.

The interlocking mechanism (shown in FIG. 10) would allow for a variety of smart kicked storage appliances 82 to be interlocked together. The smart locked storage containers are stacked and locked onto the top 84 of a base 86 which contains at least one element 88 which may provide electrical power, internet connectivity, and the like to each and/or all of the locked smart storage appliances. These functions would allow the locked smart storage appliance to provide heating, cooling, inventory and scheduling management, delivery notifications, and access control.

The base 86 that the locked smart storage appliances 82 would lock into may be in constant connection with any part of the system via ethernet or wireless connectivity protocol (WIFI, Cell, etc). The locked smart storage appliances 82 would register themselves with the base and communicate to the deliveree's account that the purchased or ordered items had been delivered.

The deliveree could also be informed about the contents of the locked smart storage appliance 82. Upon delivery, the contents of the locked smart storage appliance would be registered via element 88 with the base 86 from which it would be communicated to a central inventory management and logistics database. Once entered, the locked smart storage appliance contents would be available for viewing by the intended deliveree in their account.

The base 86 may have electronic connectors (not shown) on the bottom, top or sides thereof to allow for the stacked, interconnected and locked smart storage containers 82 to be provided power and Internet connectivity via element 88. Alternatively, wireless protocols such as Bluetooth, WIFI, NEC, RFID, or other wireless protocols could be used for internet connectivity or simple data transfer while power could be supplied by physical connection between the interconnected smart locked storage containers.

The locked smart storage appliances, themselves, could, according to the invention, be delivered by an agent, driverless vehicle, drone, or other delivery means to any desired location for future deliveries of ordered items.

Another embodiment of the invention relates to a locked smart storage appliance base 86 that may be permanently affixed at a secure location. It is an advantageous feature of the invention that the smart locked storage containers delivery containers 82 may be easily connected with or removed from base 86 or interchanged with other containers 82.

Figure 9:
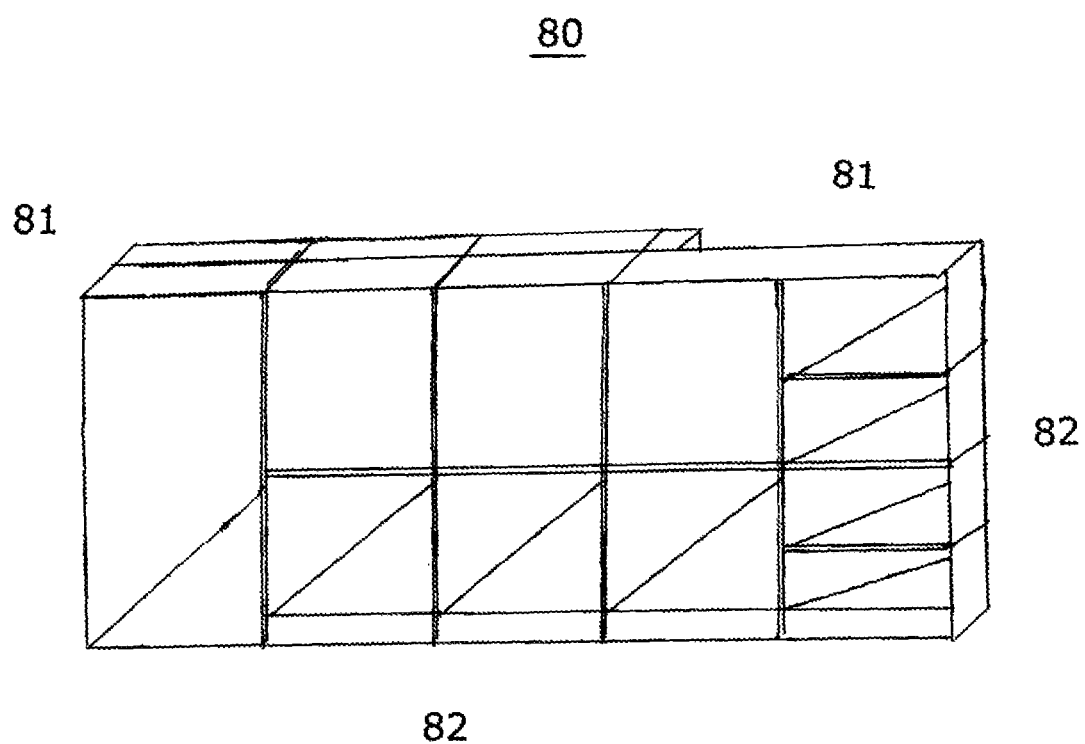
FIG. 9 is a perspective front view of a system comprising a plurality of files of interlocking smart locked storage appliances.

FIG. 9 illustrates an embodiment of a system 60 comprising multiple files or rows 81 of interlocking smart locked storage appliances 82 of differing sizes.

Figure 10:
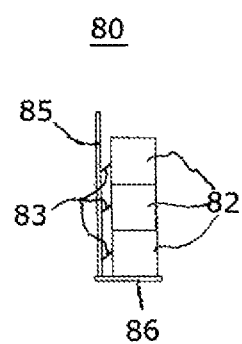
FIG. 10 is a perspective side view of a system comprising a single file of interlocking smart locked storage appliances.

FIG. 10 illustrates an embodiment of a system 80 showing the locked storage containers 82 affixed to base 86 and interconnected with each other via locking mechanisms 83 which are connected to stabilizing rack 85.

It will be understood by those skilled in the art that any of the scheduling, signaling and communication techniques described above may be employed in connection with the improved delivery system and method of the invention without departing from the spirit and scope thereof.

Although various specific constructions and steps have, been shown and discussed, these are for illustrative purposes only. Various modifications will be apparent to those of skill in the art. Therefore, the scope of the present invention should be determined with reference to the claims appended hereto.

What is claimed is:

1. A method for the delivery of at least one purchased or ordered item to at least one of a plurality of smart locked storage appliances, each smart locked storage appliance being associated with a corresponding customer, the method comprising, following the purchase or order of the at least one item, determining the availability of a locked storage appliance to receive the delivery at one or more times, identifying a time interval during which the delivery can be made, sending to the identified locked storage appliance an access signal allowing a delivery agent access to the locked storage appliance only during the time interval for delivery thereto of the at least one item, wherein the plurality of smart locked storage appliances are interlocked together and electrically, electronically and/or wirelessly communicatively connected to each other and a network.

2. The method of claim 1 wherein said network enables said determining of availability to receive delivery, said identification of time intervals for delivery, said sending of access signals allowing delivery and internet connectivity.

3. The method of claim 1 wherein said plurality of smart storage appliances are positioned on top of a base element.

4. The method of claim 3 wherein said base element comprises at least one element capable of electrode said electrical, electronic and/or wireless communication.

5. The method of claim 4 wherein said electronic communication enables the provision of electrical power or internet connectivity to said at least one of said smart storage appliances.

6. The method of claim 5 wherein said at least one smart locked storage appliance comprises at least one element enabled by said electrical power to provide a function selected from the group consisting of heating, cooling, inventory, scheduling management, delivery notifications, access control and any combination thereof.

7. The method of claim 4 wherein said electronic communication comprises a wireless protocol.

8. The method of claim 1 wherein said plurality of interlocked smart locked storage appliances are interconnected together either vertically, horizontally, or both.

9. The method of claim 8 wherein said plurality of interlocked smart locked storage appliances are positioned on a stabilizing rack element.

10. A delivery system for delivery of at least one ordered or purchased item comprising:
a plurality of smart locked storage appliances, each smart locked storage appliance corresponding to a customer;
an order receiver for receiving orders for delivery of said at least one ordered or purchased items to said customer;
an availability determiner for determining the availability of the smart locked storage appliances to receive deliveries at one or more times;
a scheduler receiving availability information from the availability determiner and operable to identify a time interval during which the delivery can be made and operable to send to an interlocked smart locked storage appliance an access signal allowing a delivery agent to access the interlocked smart locked storage appliance only during the time interval identified by the scheduler;
wherein the plurality of smart locked storage appliances are interlocked together and electrically, electronically and/or wirelessly communicatively connected to each other and a network.

11. The delivery system of claim 10 wherein said network enables said determining of availability to receive delivery, said identification of time intervals for delivery, said sending of access signals allowing delivery and internet connectivity.

12. The delivery system of claim 10 wherein said plurality of locked storage appliances are interlocked with each other either vertically, horizontally or both.

13. The delivery system of claim 12 additionally comprising a base element on the top of which said interlocked plurality of smart locked storage appliances are positioned.

14. The delivery system of claim 13 wherein said base element comprises at least one element capable of said electrical, electronic and/or wireless communication.

15. The delivery system of claim 10 wherein said at least one interlocked smart storage appliance comprises at least one element enabled by said electrical power to provide a function selected from the group consisting of heating, cooling, inventory, scheduling management, delivery notifications, access control and any combination thereof.

* * * * *